United States Patent [19]

Nishi et al.

[11] Patent Number: 5,022,057
[45] Date of Patent: Jun. 4, 1991

[54] BIT SYNCHRONIZATION CIRCUIT

[75] Inventors: Yumiko Nishi, Tokyo; Yutaka Torii; Norihumi Komatu, both of Yokohama; Seiichi Takaki, Fujisawa, all of Japan

[73] Assignees: Hitachi, Ltd., Tokyo; Hitachi Communication Systems, Inc., Yokohama, both of Japan

[21] Appl. No.: 321,141

[22] Filed: Mar. 9, 1989

[30] Foreign Application Priority Data

Mar. 11, 1988 [JP] Japan .................................. 63-56081
Jun. 22, 1988 [JP] Japan ................................ 63-152320

[51] Int. Cl.$^5$ ............................................. H03L 7/00
[52] U.S. Cl. ..................................... 375/119; 328/61; 328/63
[58] Field of Search .................... 375/4, 106, 111, 119; 370/100, 105.3; 328/55, 61, 63, 155, 72, 74

[56] References Cited

U.S. PATENT DOCUMENTS

| | | | |
|---|---|---|---|
| 4,095,051 | 6/1978 | Crue | 370/100 |
| 4,386,323 | 5/1983 | Jansen | 375/119 |
| 4,575,860 | 3/1986 | Scordo | 375/119 |
| 4,780,889 | 10/1988 | Ley et al. | 375/106 |
| 4,821,296 | 4/1989 | Cordell | 375/119 |

Primary Examiner—Benedict V. Safourek
Attorney, Agent, or Firm—Antonelli, Terry, Stout & Kraus

[57] ABSTRACT

A telephone exchange system has a plurality of bit synchronization circuit each provided for an individual subscriber's line. A single clock generating circuit which generates a plurality of clocks is provided in common to the plurality of bit synchronization circuits. The bit synchronization circuit selects one clock of a phase suitable for regenerating an input data signal among the plurality of clocks applied thereto by the clock generating circuit, and regenerates and phases the input data signal by using the selected clock.

8 Claims, 13 Drawing Sheets

FIG. 6

REGENERATIVE CLOCK SELECTING ALGORITHM

| RESULTS OF DETECTION | | | | REGENERATIVE CLOCK SELECTION SIGNAL | | | | ALM OUTPUT |
|---|---|---|---|---|---|---|---|---|
| S 1 | S 2 | S 3 | S 4 | C 1 | C 2 | C 3 | C 4 | |
| L | L | L | L | L | L | L | L | H |
| H | L | L | L | L | L | H | L | L |
| L | H | L | L | L | L | L | H | L |
| H | H | L | L | L | L | L | H | L |
| L | L | H | L | H | L | L | L | L |
| H | L | H | L | L | L | L | L | H |
| L | H | H | L | H | L | L | L | L |
| H | H | H | L | L | L | L | H | L |
| L | L | L | H | L | H | L | L | L |
| H | L | L | H | L | L | H | L | L |
| L | H | L | H | L | L | L | L | H |
| H | H | L | H | L | L | H | L | L |
| L | L | H | H | L | H | L | L | L |
| H | L | H | H | L | H | L | L | L |
| L | H | H | H | H | L | L | L | L |
| H | H | H | H | L | L | L | L | H |

FIG. 12

REGENERATIVE CLOCK SELECTING ALGORITHM

| RESULTS OF DETECTION | | | | REGENERATIVE CLOCK SELECTION SIGNAL | | | | ALM OUTPUT |
|---|---|---|---|---|---|---|---|---|
| S 1 | S 2 | S 3 | S 4 | C 1 | C 2 | C 3 | C 4 | |
| L | L | L | L | L | L | L | L | H |
| H | L | L | L | L | L | H | L | L |
| L | H | L | L | L | L | L | H | L |
| H | H | L | L | L | L | L | H | L |
| L | L | H | L | H | L | L | L | L |
| H | L | H | L | L | L | L | L | H |
| L | H | H | L | H | L | L | L | L |
| H | H | H | L | L | L | L | H | L |
| L | L | L | H | L | H | L | L | L |
| H | L | L | H | L | L | H | L | L |
| L | H | L | H | L | L | L | L | H |
| H | H | L | H | L | L | H | L | L |
| L | L | H | H | L | H | L | L | L |
| H | L | H | H | L | H | L | L | L |
| L | H | H | H | H | L | L | L | L |
| H | H | H | H | L | L | L | L | H |

RANGE OF DATA EXTRACTION
BY SCK (=CK3)

| DATA SAMPLED BY CK1 (D1) | DATA SAMPLED BY CK2 (D2) | DATA SAMPLED BY CK3 (D3) | CLOCK COINCIDING WITH THE FIRST HIGH | CLOCK COINCIDING WITH THE SECOND HIGH | OUTPUT OF THE OPTIMUM CLOCK SELECTING CIRCUIT |
|---|---|---|---|---|---|
| L | L | H | CK3 | CK1 | ONLY S1 IS HIGH |
| L | H | H | CK2 | CK3 | ONLY S2 IS HIGH |
| H | H | H | CK1 | CK2 | ONLY S3 IS HIGH |

BIT SYNCHRONIZATION CIRCUIT

BACKGROUND OF THE INVENTION AND RELATED ART STATEMENT

The present invention relates to a bit synchronization circuit for synchronizing an input signal of an arbitrary phase with a clock of a fixed clock rate.

The speech path equipment of a telephone exchange system is equipped with a bit synchronization circuit for each subscriber's line for switching after phasing input data of different phases differing with subscriber's lines.

Broad-band integrated service digital network (ISDN) service has been developed progressively in recent years and efforts have been made for the standardization of communication equipments capable of transmitting signals at a high subscriber's line data signaling rate on the order of 150 Mb/sec.

In a telephone exchange system for dealing with signal transmission at such a high data signaling rate, waveform distortion resulting from phase jitter that occurs when data passes cables, connectors or switches, and the variation of duty cycle has great influence on the performance of the telephone exchange system because the pulse width of the signal is small, and increase in the number and scale of switches enhances the waveform distortion, which makes the reproduction of signals impossible.

Accordingly, the data must be regenerated every time the data passes a switch to correct waveform distortion. A bit synchronization circuit is used as means for regenerating data.

The bit synchronization circuit phases input data by synchronizing the input data of an arbitrary phase with a clock of a fixed clock rate, for example, 150 MHz, for signal regeneration. Accordingly, the waveform distortion, such as jitter, of the input data can be corrected by regenerating the input data by the bit synchronization circuit.

In regenerating input data by such a bit synchronization circuit using a clock of a fixed clock rate, the change point of the clock must be synchronized with the center of one period of the input data, since the waveform of the periphery of each period of the input data is distorted and the change point is unstable.

A bit synchronization circuit of such a kind is disclosed in D. Boettle & M. Klein, "High Speed (140 Mb/sec) Switching Techniques for Broad-band Communications", Proceedings of International Zurich Seminar on Digital Communications 1986, C4.1–C4.4, pp. 97–100, FIG. 6. This known bit synchronization circuit delays input data by a fixed time, compares the phases of the delayed input data and a clock, and controls the delay of the input data so that the change point of the clock coincides with the center of the input data. The bit synchronization circuit is provided with a plurality of retardation elements for delaying the input data, and a control circuit for controlling the delay time.

The telephone exchange system must be provided with a bit synchronization circuit for each subscriber's line. Accordingly, it is desirable to employ a LSI as a bit synchronization circuit to construct a large-scale telephone exchange system.

However, it has been difficult to construct the aforesaid known bit synchronization circuit, because the bit synchronization circuit needs to be provided with many retardation elements taking into consideration difference in propagation delay time between the retardation elements, and the delay time control circuit is complicated. Furthermore, the control circuit and the phase difference detecting circuit of the bit synchronization circuit are complicated, and hence a comparatively long time is required for synchronizing the change point of the clock with the center of the input data after the detection of the phase difference. Furthermore, step-out occurs immediately when the input data includes noise, and the margin of operation for covering the fluctuation of the input data is small.

OBJECTS AND SUMMARY OF THE INVENTION

Accordingly, it is an object of the present invention to provide a bit synchronization circuit for high-speed data signaling operation, capable of being constructed in a LSI.

It is another object of the present invention to provide a bit synchronization circuit capable of synchronizing high-speed data signals with a clock in a reduced time.

It is a further object of the present invention to provide a bit synchronization circuit capable of stably processing high-speed data signals.

To achieve the foregoing objects, the present invention provides a bit synchronization circuit which receives a plurality of clocks of different phases from a single clock generating circuit provided in common to a plurality of bit synchronization circuit, the bit synchronization circuit detects the phase differences between input data and the plurality of clocks received from the clock generating circuit, and then selects an appropriate clock for data regeneration.

Thus, the bit synchronization circuit in accordance with the present invention comprises: latch means for receiving a plurality of clocks of different phases from a clock generating circuit and latches input data on the basis of those clocks; detecting means for detecting the change point of the input data from the output of the latch means; regenerative clock selecting means for selecting a clock for data regeneration among the plurality of clocks generated by the clock generating circuit; and phasing means for phasing the input data after regenerating the input data by using the selected regenerative clock.

BRIEF DESCRIPTION OF THE DRAWINGS

FIG. 6 is a clock selecting algorithm to be used by the regenerative clock selecting circuit of FIG. 3;

FIG. 12 is a regenerative clock selecting algorithm to be used by the regenerative clock selecting circuit of FIG. 7;

DETAILED DESCRIPTION OF THE PREFERRED EMBODIMENTS

A telephone exchange system including bit synchronization circuits in accordance with the present invention will be described with reference to FIG. 1.

Figure 1:
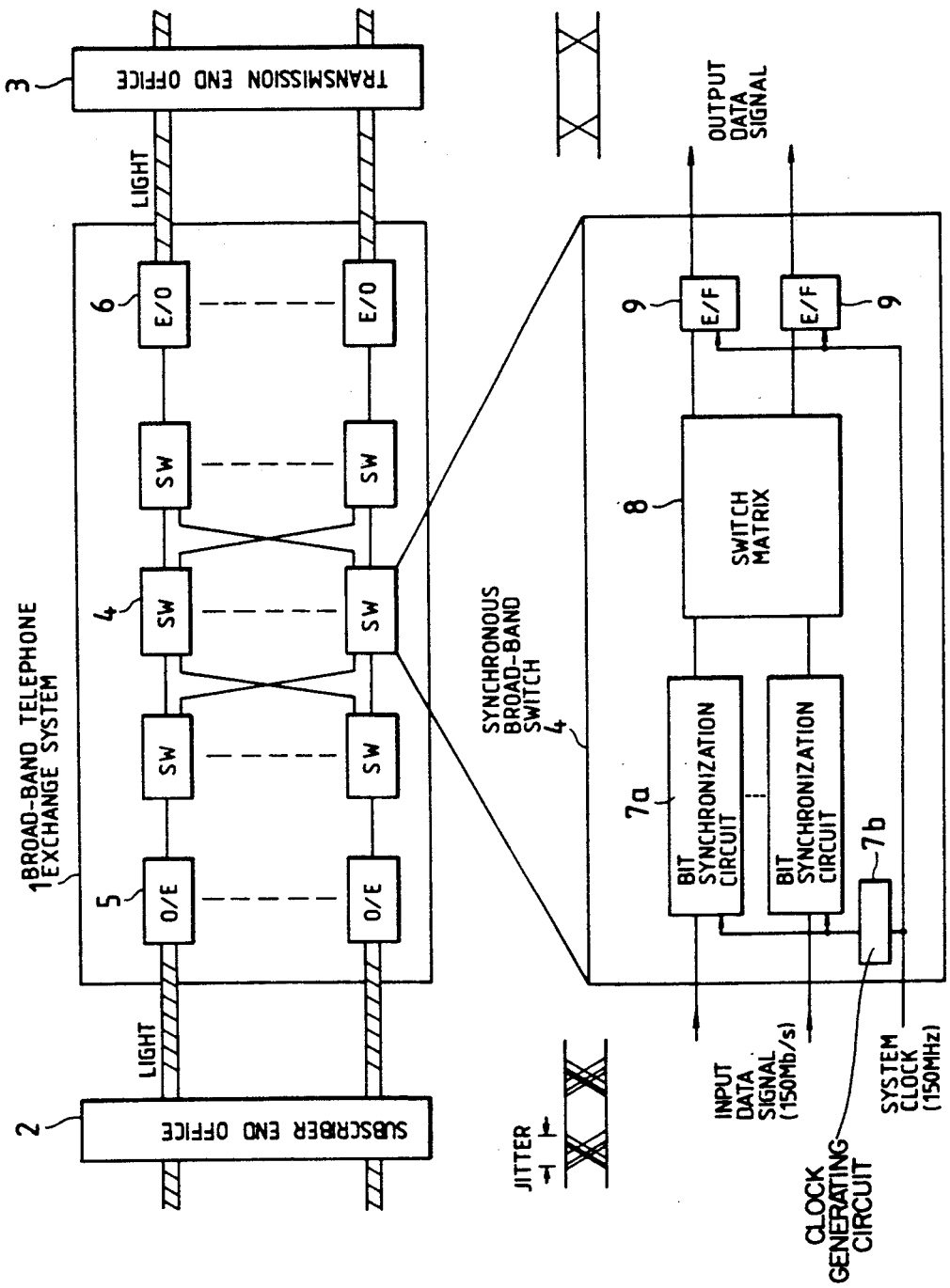
FIG. 1 is a block diagram showing the construction of a telephone exchange system employing bit synchronization circuits according to the present invention.

Referring to FIG. 1 showing the construction of an exemplary synchronous broad-band exchange system for exchanging data at a data signaling rate of 150 Mb/sec, there are shown a broad-band exchange system 1 of a space-division three-stage link type, a subscriber end office 2, a transmission end office 3, synchronous broad-band switches (SWs) 4, optical-electric converters (O/Es) 5, and electric-optical converters (E/Os) 6.

The synchronous broad-band switch 4 comprises bit synchronization circuits 7a each for a subscriber's line, a clock generating circuit 7b common to all the bit synchronization circuits 7a, a switch matrix 8, and flip-flops (F/Fs) 9.

An optical signal carrying input data applied to the broad-band exchange system 1 by the subscriber end office 2 is converted into a corresponding electric signal by the optical-electric converter 5, the electric signal is converted by the three synchronous broad-band switches 4, the electric signal is converted again into a corresponding optical signal, and then the optical signal is transmitted to the transmission end office 3. In each synchronous broad-band switch 4, the input data including jitter, such as waveform distortion, is regenerated and synchronized by the bit synchronization circuit 7a provided for each subscriber's line, the regenerated and synchronized input data is converted by the switch matrix 8, and then the converted input data, i.e., output data, is provided through the flip-flop 9. Thus, the bit synchronization circuit 7a corrects the waveform distortion of the input data to provide the output data having small waveform distortion.

Although the telephone exchange system employing the bit synchronization circuits in accordance with the present invention shown in FIG. 1 is a synchronous exchange system of a space-division three-stage link type, the bit synchronization circuits of the present invention are applicable to space-division exchange system/time-division exchange system, and STM exchange system/ATM exchange system. The bit synchronization circuits of the present invention is particularly suitable for application to an exchange system for exchanging data at a data signaling rate on the order of 150 Mb/sec.

Figure 2:
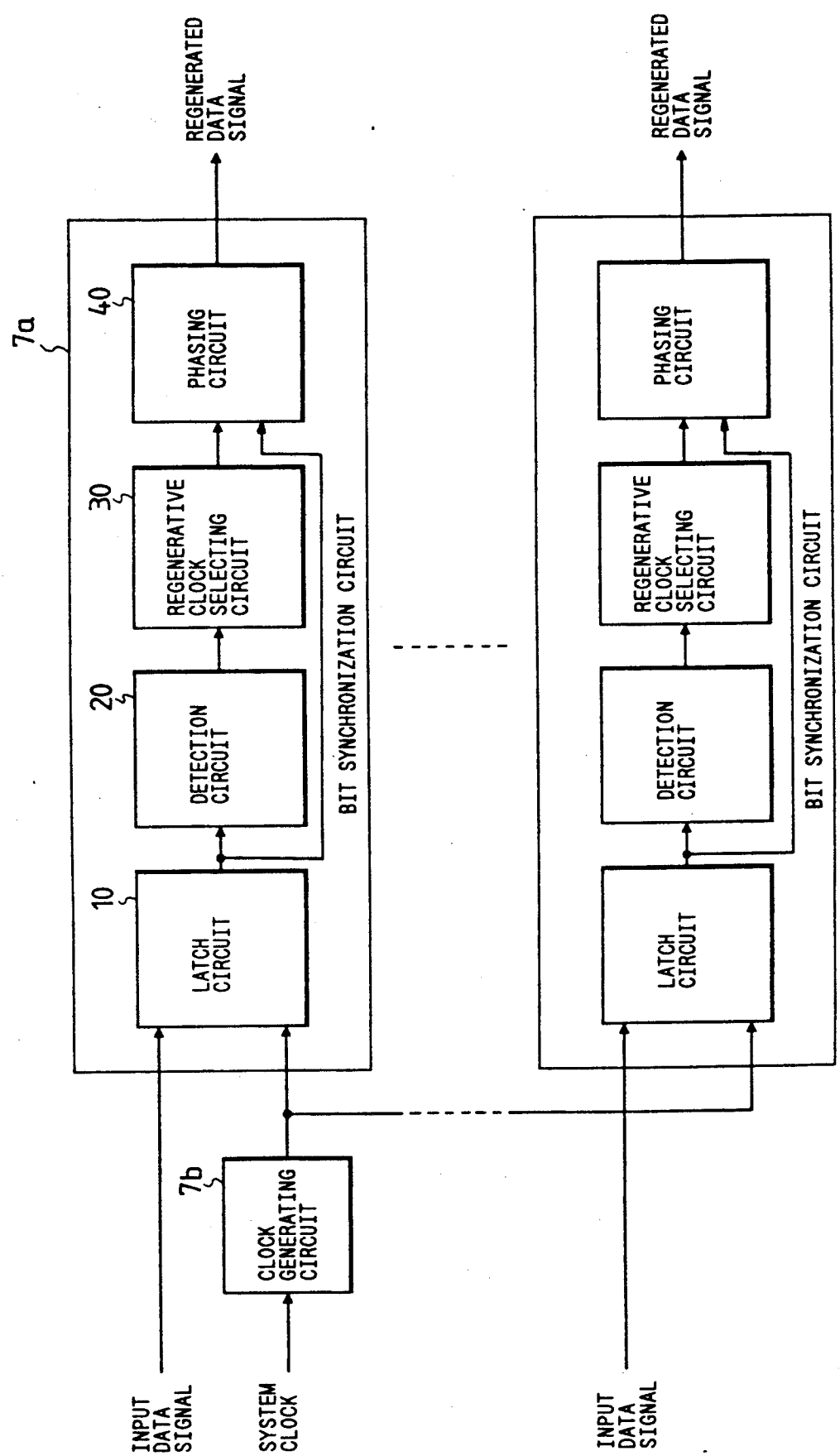
FIG. 2 is a block diagram of the bit synchronization circuit embodying the present invention.

Referring to FIG. 2, the single clock generating circuit 7b is provided in common to all the bit synchronization circuits 7a. A system clock is applied to the clock generating circuit 7b. Then, the clock generating circuit 7b delays the system clock sequentially to generate a plurality of clocks of different phases. The plurality of clocks of different phases are applied to each bit synchronization circuit 7a.

Each bit synchronization circuit 7a comprises a latch circuit 10, a detection circuit 20, a regenerative clock selecting circuit 30 and a phasing circuit 40.

The latch circuit 10 receives the plurality of clocks of different phases from the clock generating circuit 7b, and latches the input data in synchronism with the clocks to generate a plurality of latch output signals.

The detection circuit 20 receives the latch output signals from the latch circuit 10, and compares the latch output signals to detect the change point of the input data.

The regenerative clock selecting circuit 30 receives the result of detection from the detection circuit 20, and then selects one of the plurality of clocks generated by the clock generating circuit 7b as a regenerative clock for data regeneration on the basis of the result of detection.

The phasing circuit 40 regenerates the input data by using the clock selected by the regenerative clock selecting circuit 30, phases the regenerated input data, and then provides regenerated data.

The detection circuit 20 and the regenerative clock selecting circuit 30 may be substituted by a single integrated circuit having the functions of both the detection circuit 20 and the regenerative clock selecting circuit 30.

A bit synchronization circuit in a first embodiment according to the present invention will be described hereinafter with reference to FIGS. 3 to 6.

Figure 3:
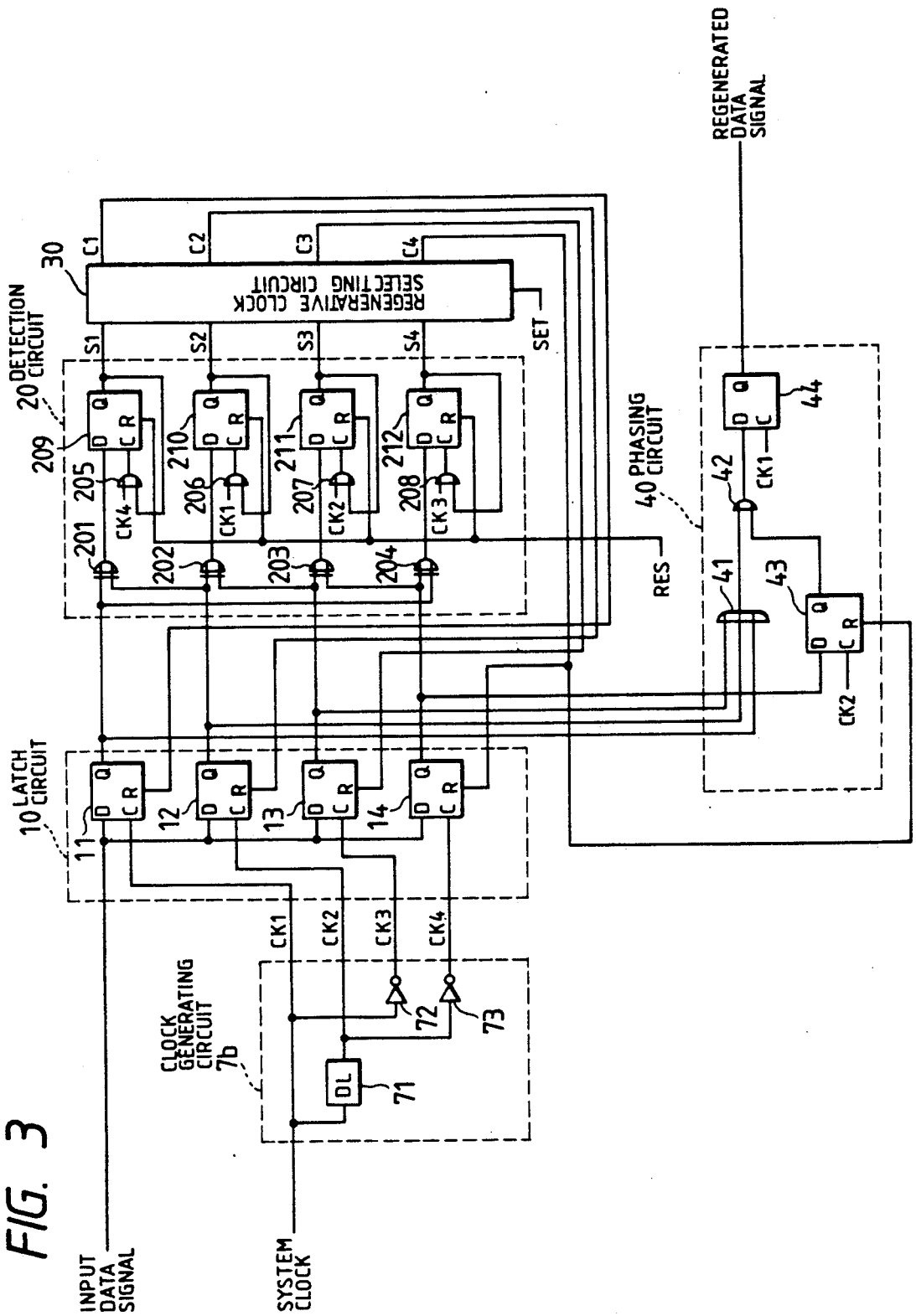
FIG. 3 is a circuit diagram of a bit synchronization circuit and a clock generating circuit in a first embodiment according to the present invention.
Figure 4:
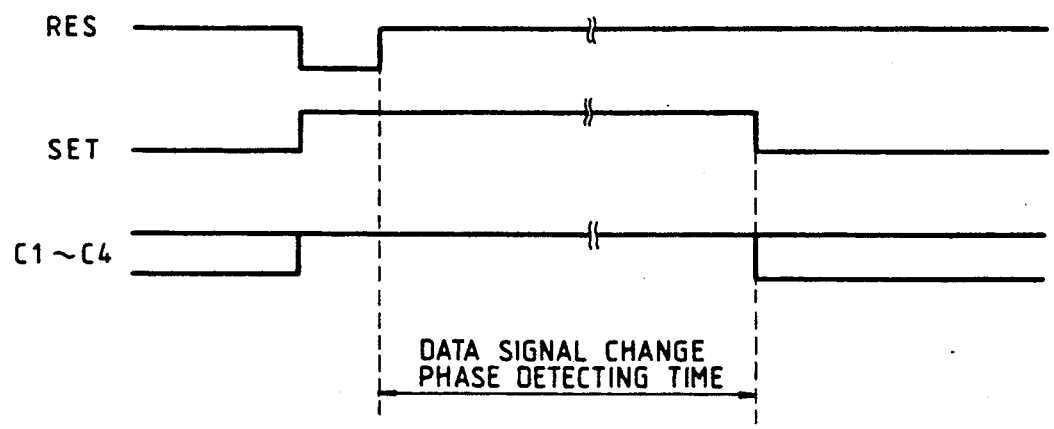
FIGS. 4 and 5 are time chart of assistance in explaining the operation of the bit synchronization circuit of FIG. 3.

Referring to FIG. 3, the bit synchronization circuit comprises a latch circuit 10, a detection circuit 20, a regenerative clock selecting circuit 30 and a phasing circuit 40.

The latch circuit 10 comprises four D-flip-flops 11, 12, 13 and 14. An input data signal is applied to the respective D terminals of the flip-flops 11, 12, 13 and 14. Clocks CK1, CK2, CK3 and CK4 of sequentially different phases (that is, the phase of the succeeding clock lags from that of the preceding clock by 90°) are applied to the respective C terminals of the flip-flops 11, 12, 13 and 14.

The detection circuit 20 comprises four EXOR (exclusive OR) gates 201, 202, 203 and 204, four OR gates 205, 206, 207 and 208, and four D-flip-flops 209, 210, 211 and 212. The latch circuit 10 applies the Q output of the flip-flop 11 and the Q output of the flip-flop 12 to the EXOR gate 201, the Q output of the flip-flop 12 and the Q output of the flip-flop 13 to the EXOR gate 202, the Q output of the flip-flop 13 and the Q output of the flip-flop 14 to the EXOR gate 203, and the Q output of the flip-flop 14 and the Q output of the flip-flop 15 to the EXOR gate 204. The clock CK4 generated by the clock generating circuit 7b and the Q output of the flip-flop 209 are applied to the OR gate 205; the clock CK1 and the Q output of the flip-flop 210 are applied to the OR gate 206; the clock CK2 and the Q output of the flip-flop 211 are applied to the OR gate 207; and the clock CK3 and the Q output of the flip-flop 212 are applied to the OR gate 208. The outputs of the EXOR gates 201, 202, 203 and 204 are applied respectively to the respective D terminals of the flip-flops 209, 210, 211 and 212. The outputs of the OR gates 205, 206, 207 and 208 are applied respectively to the respective C terminals of the flip-flops 209, 210, 211 and 212. A reset signal RES, which is applied to the bit synchronization circuit for starting, is applied to the R terminals of the flip-flops 209, 210, 211 and 212.

The regenerative clock selecting circuit 30 receives the Q outputs S1, S2, S3 and S4 of the flip-flops 209, 210, 211 and 212 from the detection circuit 20, and provides regenerative clock selection signals C1, C2, C3 and C4. The regenerative clock selection signals C1, C2, C3 and C4 are applied to the R terminals of the flip-flops 11, 12, 13 and 14 of the latch circuit 10, respectively.

The phasing circuit 40 comprises OR gates 41 and 42 and D-flip-flops 43 and 44. The OR gate 41 receives the Q outputs of the flip-flops 11, 12 and 13 of the latch circuit 10. The Q output of the flip-flop 14 of the latch circuit 10, the clock CK2 generated by the clock generating circuit 7b, and the output C4 of the regenerative clock selecting circuit 30 are applied to the D terminal, the C terminal and the R terminal of the flip-flop 43, respectively. The output of the OR gate 41 and the Q output of the flip-flop 43 are applied to the OR gate 42. The output of the OR gate 42 and the clock CK1 generated by the clock generating circuit 7b are applied to the D terminal and the C terminal of the flip-flop 44. The flip-flop 44 provides a regenerated data signal through the Q output.

The clock generating circuit 7b, which generates the four clocks CK1, CK2, CK3 and CK4 of different phases sequentially lagging at a step of 90°, by sequentially retarding the phase of the system clock comprises a retardation element 71 for delaying the phase of the system clock by a quarter of the period (90°) and inverters 72 and 73. The system clock proper is the clock CK1, the output of the retardation element 71 is the clock CK2, and the outputs of the inverters 72 and 73 are the clocks CK3 and CK4, respectively.

The operation of the bit synchronization circuit thus constructed will be described hereinafter.

In starting the bit synchronization circuit, a reset signal RES and a set signal SET (FIG. 4) are applied to the detection circuit 20 and the regenerative clock selecting circuit 30, respectively. The flip-flops 209, 210, 211 and 212 of the detection circuit 20 are reset and the Q outputs S1, S2, S3 and S4 go LOW. Consequently, one of the input terminals of each of the OR gates 205, 206, 207 and 208 becomes LOW, so that the clocks CK1, CK2, CK3 and CK4 are applied respectively to the flip-flops 209, 210, 211 and 212. Then, the reset signal RES goes HIGH again to enable the flip-flops. When the set signal SET is applied to the regenerative clock selecting circuit 30, the clock selection signals C1, C2, C3 and C4 go HIGH and the R terminals of the flip-flops 11, 12, 13 and 14 of the latch circuit 10 go HIGH, so that the system is enabled. Detection is executed in a period in which the set signal SET is HIGH after the leading edge of the reset signal RES.

The flip-flops 11, 12, 13 and 14 of the latch circuit 10 latch the input data signal at the respective leading edges of the clocks CK1, CK2, CK3 and CK4, respectively, and give the latched input data signals to the EXOR gates 201, 202, 203 and 204 of the detection circuit 20, respectively. Since the outputs of the EXOR gates 201, 202, 203 and 204 go HIGH when two different input signals are applied to the input terminals of each of them, it is possible to find the clock which caused the input data signal to change from the examination of the condition of the output signals of the EXOR gates 201, 202, 203 and 204 after latching the input data signal by the flip-flops 11, 12, 13 and 14. The flip-flops 209, 210, 211 and 212 latch the results of detection respectively at the clocks CK1, CK2, CK3 and CK4. For example, with the D-flip-flop 209, the flip-flops 11 and 12 latch the input data signal by the clocks CK1 and CK4, the EXOR gate 201 decides whether or not the input data changed, and then the flip-flop 209 latches the decision of the EXOR gate 201 by the clock CK4. Upon latching data change, the Q outputs of the D-flip-flops 209, 210, 211 and 212 go HIGH. Consequently, one of the inputs of each of the OR gates connected respectively to the Q outputs of the flip-flops 209, 210, 211 and 212 goes HIGH and the outputs of the OR gates are held HIGH. Consequently, the clocks are not applied to the flip-flops 209, 210, 211 and 212, and hence the Q outputs of the flip-flops 209, 210, 211 and 212 are held HIGH. That is, once data variation phase is detected during a detection period, the output of the detection circuit goes HIGH.

The detection of data variation phase ends at a moment where the set signal SET goes LOW, and then the regenerative clock selecting circuit 30 selects a regenerative clock on the basis of the outputs S1, S2, S3 and S4 of the detection circuit 20 according to a regenerative clock selection algorithm shown in FIG. 6 to provide the regenerative clock selection signals C1, C2, C3 and C4 representing the results of selection, respectively. Only the generative clock selection signal corresponding to a selected clock among the regenerative clock selection signals C1, C2, C3 and C4 applied to the R terminals of the flip-flops 11, 12, 13 and 14 is HIGH and the rest of the generative clock selection signals are LOW. Consequently, the flip-flops which received the LOW generative clock selection signals among the flip-flops 11, 12, 13 and 14 are disabled, so that the Q outputs of the same go LOW.

The regenerated data signal is applied to the phasing circuit 40. Except when the input data signal is regenerated by the flip-flop 14, the regenerated data is transferred through the OR gates 41 and 42 and is latched by the clock CK1 (system clock) by the flip-flop 44 for phasing. In regenerating the input data signal by the flip-flop 14, since the set-up time of the flip-flop is insufficient, the regenerated signal is latched temporarily by the clock CK2 to delay the regenerated data in order to compensate for the insufficient set-up time of the flip-flop 44, and then the regenerated data is latched by the flip-flop 44 by the clock CK1 for phasing.

Figure 5:
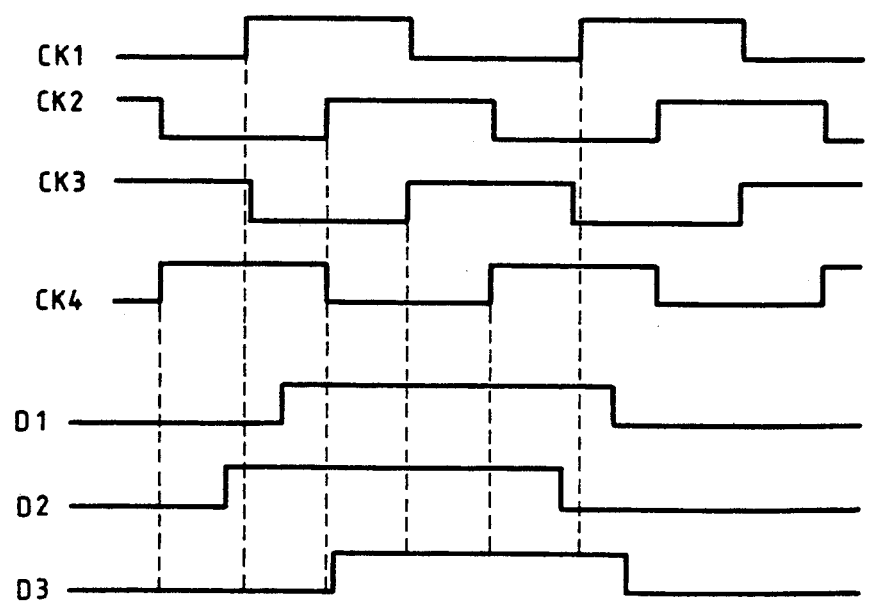

The operation of the bit synchronization circuit for synchronizing a fluctuating input data signal will be described hereinafter with reference to FIG. 5. As shown in FIG. 5, input data signals D1, D2 and D3 have phase jitters, and data change phase variation is created. The waveforms of the input data signals D1, D2 and D3 indicate that the phase of the input data signal D2 changes first, the phase of the input data signal D1 changes second and the phase of the input data signal changes last. When the input data signals are detected continuously for a fixed time period, all the conditions of the input data signals D1, D2 and D3 are detected. In this example, the input data signal D2 changes between the clocks CK4 and CK1, while the input data signal D3 changes between the clocks CK2 and CK3. Consequently, the Q outputs S1, S2 and S4 of the flip-flops 209, 211 and 212 go HIGH. The regenerative clock selecting circuit 30 selects the clock CK3 as a regenerative clock according to the regenerative clock selection algorithm shown in FIG. 6. The leading edge of the clock CK3 is included in all the input data signals D1, D2 and D3, and hence the input data signals can be accurately regenerated.

Suppose that phase detection is not continued for the fixed time period and phase detection is executed only once at the reception of the input data signal D2. Then, only the Q output S4 of the flip-flop 212 goes HIGH, since data changes between the clocks CK4 and CK1. Thus, the clock CK2 is selected as a regenerative clock according to the regenerative clock selection table shown in FIG. 6. Since the leading edge of the clock CK2 corresponds to the input data signals D1 and D2, and hence normal data regeneration is possible. However, the leading edge of the input data signal D3 lags from the leading edge of the clock CK2, and hence faulty data regeneration results. That is, much information is collected and the accurate detection of data change phase can be achieved by continuing detection for the fixed time period.

In substituting the plurality of bit synchronization circuits of this embodiment by a LSI, clocks sequentially lagging at a step of 90° generated accurately by an external clock generating circuit may be applied to the LSI. Accordingly, the data need not be delayed by the retardation element, and hence the influence of the variation in delay time attributable to the retardation element can be eliminated.

A bit synchronization circuit in a second embodiment according to the present invention will be described hereinafter with reference to FIGS. 7 to 13.

Figure 7:
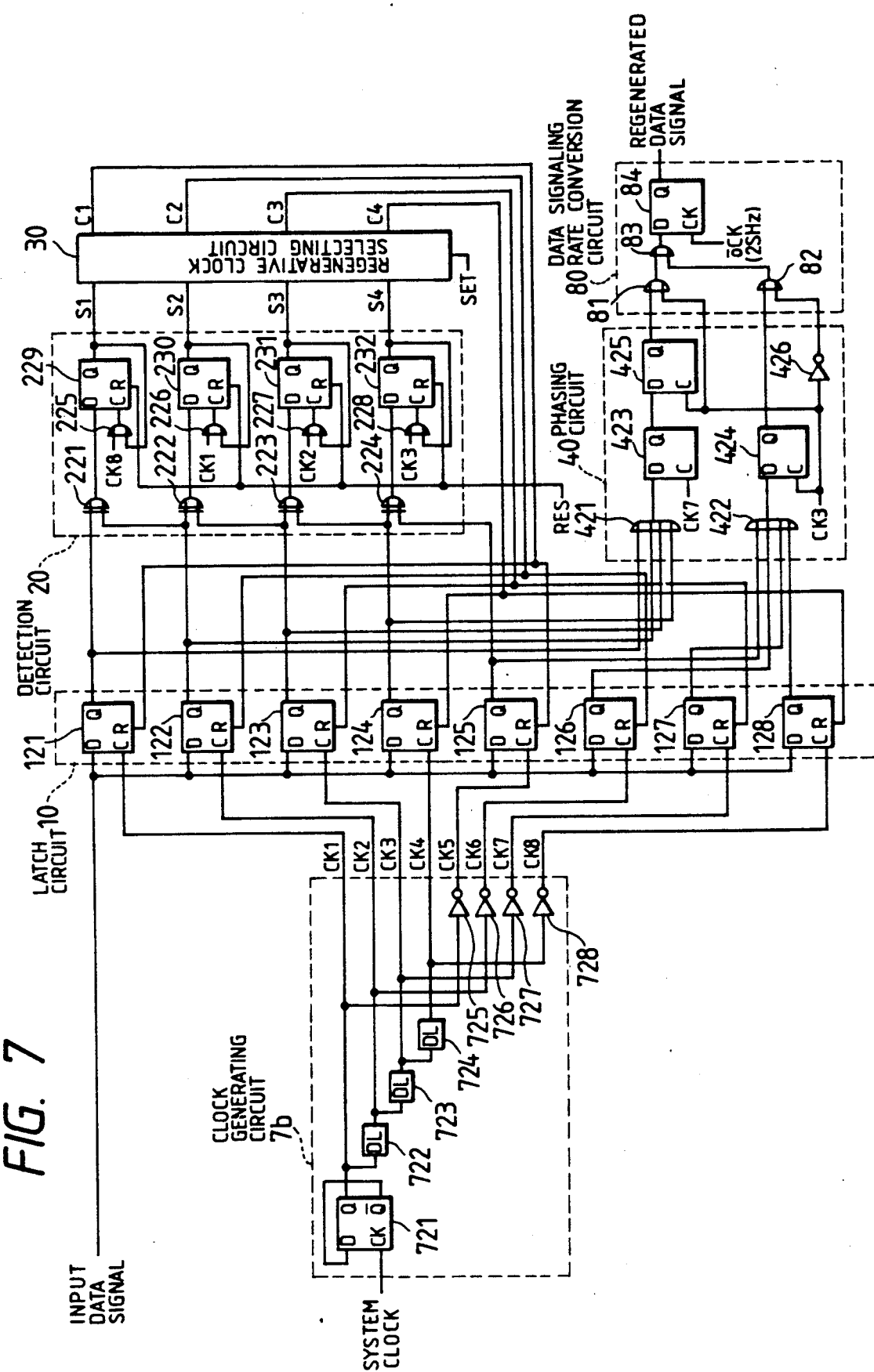
FIG. 7 is a circuit diagram of a bit synchronization circuit and a clock generating circuit in a second embodiment according to the present invention.
Figure 8:
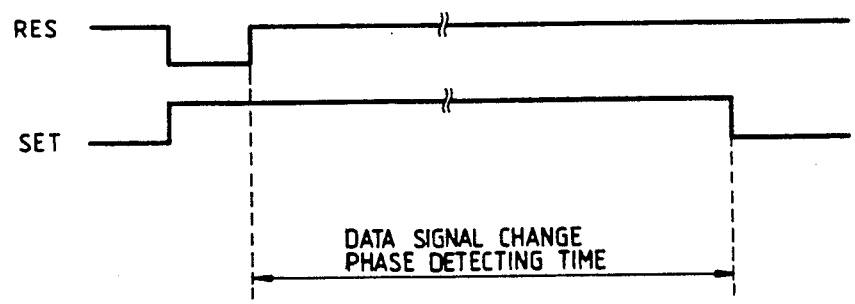
FIGS. 8, 9, 10 and 11 are time charts of assistance in explaining the operation of the bit synchronization circuit of FIG. 7.
Figure 9:
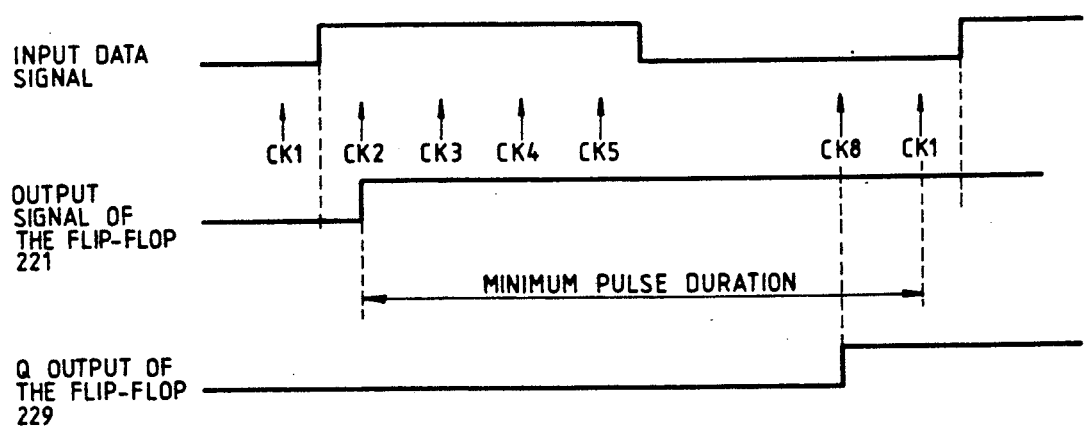

Referring to FIG. 7, the bit synchronization circuit comprises a latch circuit 10, a detection circuit 20, a regenerative clock selecting circuit 30, a phasing circuit 40 and a data signaling rate conversion circuit 80.

The latch circuit 10 comprises eight D-flip-flops 121, 122, 123, 124, 125, 126, 127 and 128. An input data signal is applied to the D terminals of the D-flip-flops 121 to 128. Clocks CK1, CK2, CK3, CK4, CK5, CK6, CK7 and CK8 respectively of eight different phases sequentially lagging at a step of ⅛ of the period and of a clock rate of S Hz (input data signaling rate is 2S b/sec) are applied to the CK terminals of the D-flip-flops 121 to 128, respectively.

The detection circuit 20 comprises four EXOR gates 221, 222, 223 and 224, four OR gates 225, 226, 227 and 228, and four D-flip-flops 229, 230, 231 and 232. The respective Q outputs of the D-flip-flops 121 and 122 are applied to the EXOR gate 221. The respective Q outputs of the D-flip-flops 122 and 123 are applied to the EXOR gate 222. The respective Q outputs of the D-flip-flops 123 and 124 are applied to the EXOR gate 223. The respective Q outputs of the D-flip-flops 124 and 125 are applied to the EXOR gate 224. The clock CK8 and the Q output of the D-flip-flop 229 are applied to the OR gate 225. The clock CK1 and the Q output of the D-flip-flop 230 are applied to the OR gate 226. The clock CK2 and the Q output of the D-flip-flop 231 are applied to the OR gate 227. The clock CK3 and the Q output of the D-flip-flop 232 are applied to the OR gate 228. The outputs of the EXOR gates 221, 222, 223 and 224, the outputs of the OR gates 225, 226, 227 and 228, and a reset signal RES which is applied to the bit synchronization circuit for starting are applied to the D terminals, the CK terminals and the R terminals of the D-flip-flops 229, 230, 231 and 232, respectively.

The regenerative clock selecting circuit 30 receives the Q outputs S1, S2, S3 and S4 of the D-flip-flops 229, 230, 231 and 232, and provides regenerative clock selection signals C1, C2, C3 and C4. The regenerative clock selection signals C1, C2, C3 and C4 are applied to the R terminals of the D-flip-flops 121 and 125, to the R terminals of the D-flip-flops 122 and 126, to the R terminals of the D-flip-flops 123 and 127, to the R terminals of the D-flip-flops 124 and 128, respectively.

The phasing circuit 40 comprises OR gates 421 and 422, flip-flops 423, 424 and 425, and an inverter 426. The D outputs of the D-flip-flops 121, 122, 123 and 124 are applied to the OR gate 421. The Q outputs of the D-flip-flops 125, 126, 127 and 128 are applied to the OR gate 422. The output of the OR gate 421 is applied to the D terminal of the flip-flop 423. The output of the OR gate 422 is applied to the D terminal of the flip-flop 423. The clocks CK7 and CK 3 are applied to the CK terminals of the flip-flops 423 and 424, respectively. The Q output of the flip-flop 423 and the clock CK3 are applied to the D terminal and the CK terminal of the flip-flop 425, respectively.

The data signaling rate conversion circuit 80 comprises AND gates 81 and 82, an OR gate 83 and a flip-flop 84. The Q output of the flip-flop 425 and the clock CK3 are applied to the AND gate 81. The Q output of the flip-flop 424 and a clock produced by inverting the clock CK3 by the inverter 426 are applied to the AND gate 82. The outputs of the AND gates 81 and 82 are applied to the OR gate 83. The output of the OR gate 83 and a clock OCK of a clock rate twice those of the clocks CK1 to CK8 are applied to the D terminal and the CK terminals of the flip-flop 84, respectively. A regenerated data signal appears at the Q output terminal of the flip-flop 84.

The clock generating circuit 7b generates the clocks CK1 to CK8 of eight different clock phases sequentially lagging at a step of ⅛ (45°) of the period from a system clock having a clock rate of 2S b/sec. A flip-flop 721 generates a clock having a clock rate of S Hz, which is ½ of the clock rate 2S Hz of the system clock. A retardation element 722 retards the phase of the output clock (CK1) of the flip-flop 721 by ⅛ of the period, a retardation element 723 retards the phase of the output clock (CK2) of the retardation element 722 by ⅛ of the period and a retardation element 724 retards the phase of the output clock (CK3) of the retardation element 723 by ⅛ of the period. Indicated at 725, 726, 727 and 728 are inverters.

In operation, a reset signal RES and a set signal SET (FIG. 8) are applied to the detection circuit 20 and the regenerative clock selecting circuit 30, respectively, to start the bit synchronization circuit. Then, the D-flip-flops 229, 230, 231 and 232 of the detection circuit 20 are reset and the Q outputs S1, S2, S3 and S4 of the D-flip-flops 229, 230, 231 and 232 go LOW. Consequently, clocks CK8, CK1, CK2 and CK3 are applied to the D-flip-flops 229, 230, 231 and 232, since one of the input terminals of each of the OR gates 225, 226, 227 and 228 becomes LOW. Then, the flip-flops are enabled after the reset signal RES has become HIGH again. On the other hand, the set signal SET is applied to the regenerative clock selecting circuit 30 simultaneously with the application of the reset signal RES to the detection circuit 20. Then, the clock selection signals C1, C2, C3 and C4 go HIGH and the R terminals of the flip-flops 121 to 128 become HIGH, so that the bit synchronization circuit is enabled. Detection is executed during a period in which the set signal SET is HIGH after the leading edge of the reset signal RES.

The flip-flops 121 to 128 of the latch circuit 10 latch the input data signal at the leading edges of the clocks CK1 to CK8 of different phases sequentially lagging at a step of 45°, respectively. The Q outputs of the flip-flops 121 and 122, the Q outputs of the flip-flops 122 and 123, the Q outputs of the flip-flops 123 and 124, and the Q outputs of the flip-flops 124 and 125 of the latch circuit 10 are compared by the EXOR gates 221, 222, 223 and 224, respectively, to detect the clocks between which the change point of the input data exists. The D-flip-flops 229 to 232 latch the results of detection at the leading edges of the clocks CK8, CK1, CK2 and CK3, respectively. The Q output of the D-flip-flop which has latched the change point of the input data signal among the D-flip-flops 229 to 232 goes HIGH, one of the input terminals of the OR gate connected to the same D-flip-flop becomes HIGH, and then the output of the same OR gate is held HIGH. Consequently, the application of the clock to the flip-flop connected to the same OR gate is interrupted and the Q output of the same flip-flop is held HIGH. The operation of the bit synchronization circuit will be described with reference to the time chart shown in FIG. 9 with a case where the change point of the input data exists between the clocks CK1 and CK2.

The D-flip-flop 121 receives the input data signal at the clock CK1 and the Q output of the D-flip-flop 121 becomes LOW. Then, the input data signal is received by the D-flip-flop 122 at the clock CK2. Since the change point of the input data signal exists between the clocks CK1 and CK2, the Q output of the D-flip-flop 122 becomes HIGH. Consequently, the output of the EXOR gate 221 becomes HIGH. The D-flip-flop 229 receives the HIGH output of the EXOR gate 221 at the clock CK8 and latches the same. As is obvious from the time chart of FIG. 9, the pulse duration of the output of the EXOR 221 is 7/4 of the duration of the input data signal at the minimum, which is sufficiently large to latch the input data signal by the D-flip-flop 229.

The regenerative clock selecting circuit 30 selects a regenerative clock on the basis of the outputs S1, S2, S3 and S4 of the detection circuit 20 according to a regenerative clock selection algorithm shown in FIG. 12, and provides the regenerative clock selection signals C1, C2, C3 and C4. The regenerative clock selection signals other than the regenerative clock selection signal corresponding to the selected clock are LOW, and hence the Q outputs of the corresponding flip-flops are held LOW.

Figure 10:
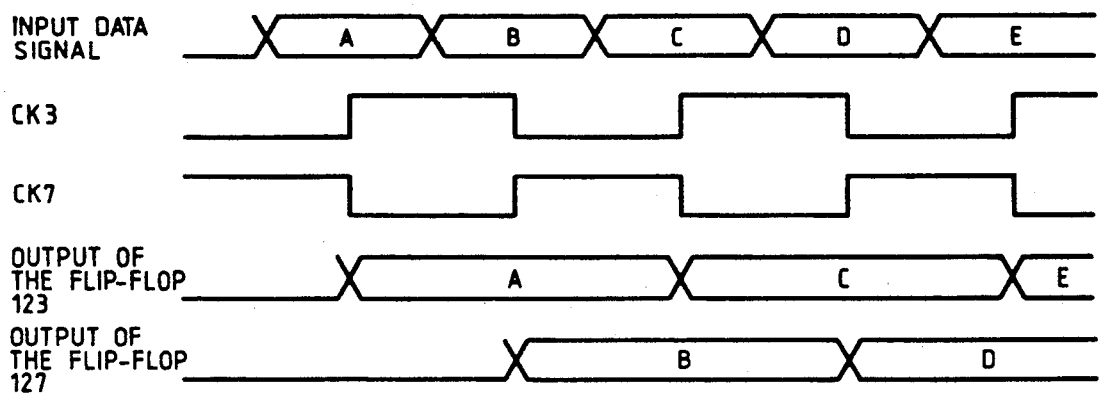
Figure 11:
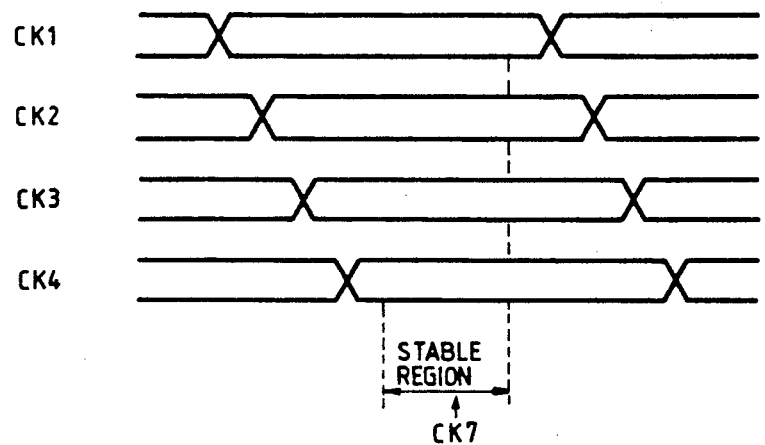

The input data signal regenerating operation using the clocks selected as regenerative clocks will be described hereinafter with reference to a time chart shown in FIG. 10, in which the clocks CK3 and CK7 are selected. The input data signal is regenerated alternately by the D-flip-flops 123 and 127 in synchronism with the selected clocks CK3 and CK7. Consequently, the input data signal is changed for 2-bit parallel data of a data signaling rate half the data signaling rate of the input data signal. Referring to FIG. 11 showing the phases of the OR gate 421 of the phasing circuit 40 respectively when the clocks CK1, CK2, CK3 and CK4 are selected, a wide stable region is available for extracting the four outputs of the OR gate 421 of four different phases in synchronism with the same clock even if the set-up time and the hold time must be taken into consideration. Accordingly, the regenerated input data signal can be phased with the clock CK7 by the flip-flop 423, which is true also with the OR gate 422 and the flip-flop 424. The Q output of the flip-flop 423 is phased again by the clock CK3 by the flip-flop 425, and then the phase of the Q output of the flip-flop 425 coincides with that of the Q output of the flip-flop 424. The AND gates 81 and 82 of the data signaling rate converting circuit 80 provide alternately the Q outputs of the flip-flops 425 and 424, respectively. Then, the Q outputs of the flip-flops 425 and 424 are applied through the OR gate 83 to the flip-flop 84. Then, the flip-flop 84 converts the Q outputs of the flip-flops 425 and 424 into a serial output data signal, namely, a regenerated output signal, having a data signaling rate of 2S b/sec.

In the second embodiment, the pulse durations of the clocks are increased by reducing the clock rate of the clocks to half the data signaling rate of the input data signal. Accordingly, the bit synchronization circuit has a large margin of operation, which is suitable for constructing the bit synchronization circuit in a LSI.

A bit synchronization circuit in a third embodiment according to the present invention will be described hereinafter with reference to FIGS. 13 to 17.

Figure 13:
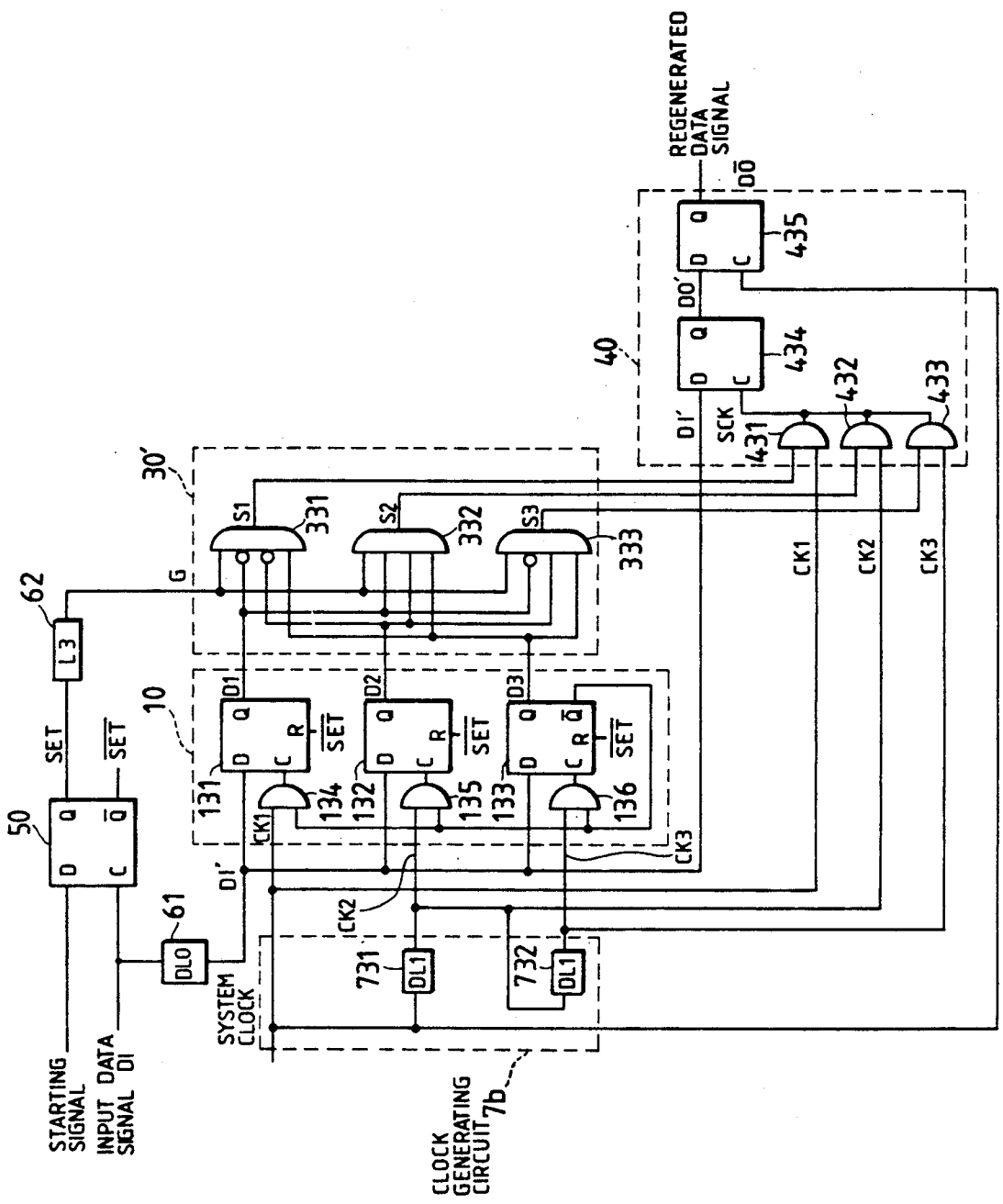
FIG. 13 is a circuit diagram of a bit synchronization circuit and a clock generating circuit in a third embodiment according to the present invention.

Referring to FIG. 13, the construction of the bit synchronization circuit in the third embodiment comprises a latch circuit 10, an optimum clock selecting circuit 30', a phasing circuit 40 and a starting circuit 50. A clock generating circuit 7b comprises retardation elements 731 and 732 to generate clocks CK2 and CK3 of phases sequentially lagging at a step of ⅓ the period of an input clock CK1.

The latch circuit 10 comprises three flip-flops 131, 132 and 133 for receiving a data signal DI' in synchronism respectively with the clocks CK1, CK2 and CK3, and three gates 134, 135 and 136 which receive the clock CK3 and interrupt the application of the clocks CK1, CK2 and CK3 respectively to the clock input terminals of the flip-flops 131, 132 and 133 when the data signal DI' received at the clock CK3 is HIGH.

The optimum clock selecting circuit 30' comprises three AND gates 331, 332 and 333. The optimum clock selecting circuit 30' selects an optimum clock closest to the center of the data signal DI' from the clocks CK1, CK2 and CK3 on the basis of the outputs D1, D2 and D3 of the latch circuit 10 according to a clock selecting algorithm, which will be described afterward. One of the output signals S1, S2 and S3 representing the results of selection of the AND gates 331, 332 and 333 is HIGH and the rest are LOW. Thus, the optimum clock selecting circuit 30' has the functions of both the detection circuit 20 and the regenerative clock selecting circuit 30 of the bit synchronization circuit of FIG. 2.

The phasing circuit 40 comprises three gates 431, 432 and 433 which receive the outputs S1, S2 and S3, and the clocks CK1, CK2 and CK3, respectively, a first flip-flop 434 which receives the input data signal DI' in synchronism with the optimum clock SCK selected by the optimum clock selecting circuit 30', and a second flip-flop 435 which extracts output data from the input data signal DI' in synchronism with a system clock CK. When the input data signal extracted by the optimum clock SCK is provided directly as a regenerated data signal in the telephone exchange system having the plurality of bit synchronization circuits, the outputs of the bit synchronization circuits are provided random. Therefore, the regenerated data signal is phased again by a system clock CK (in this embodiment, CK=CK1) by the second flip-flop 435 before transmission.

The starting circuit 50 generates a set signal SET for starting the bit synchronization circuit upon the reception of a starting signal of a fixed pulse duration corresponding to the pulse duration of at least one HIGH pulse of the input data signal. Indicated at 61 and 62 are retardation elements.

Figure 14:
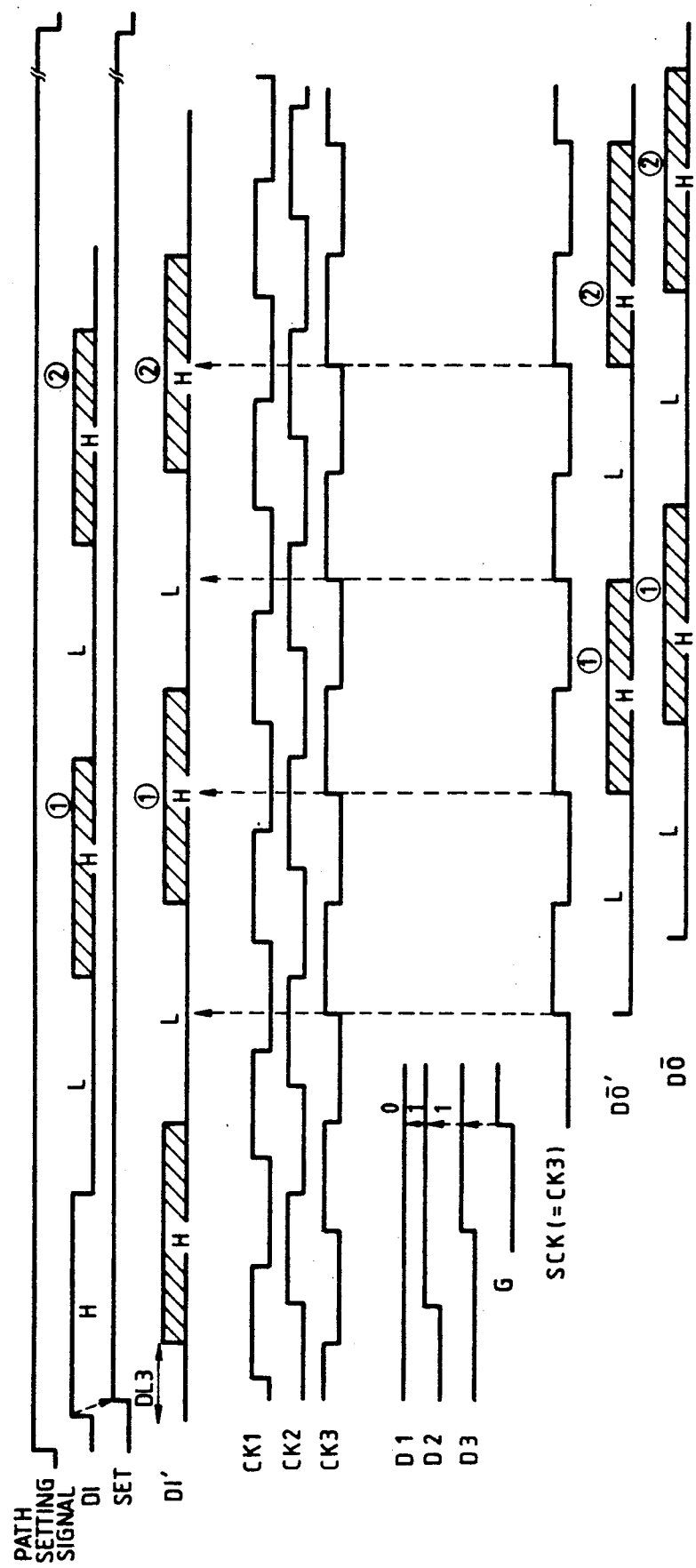
FIGS. 14, 15 and 16 are time chart of assistance in explaining the operation of the bit synchronization circuit of FIG. 13.

The operation of the bit synchronization circuit will be described hereinafter with reference to FIG. 14. In response to a path setting instruction, the set signal SET is provided by the starting circuit 50 in synchronism with the leading edge of an input data signal DI, and thereby the three flip-flops 131, 132 and 133 of the latch circuit 10 are enabled. The data signal DI' applied to the latch circuit 10 is produced by delaying the input data signal DI by a fixed time by the retardation element 61. The flip-flops 131, 132 and 133 receives the data signal DI' in synchronism with the clocks CK1, CK2 and CK3 and provide the output signals D1, D2 and D3, respectively. When the signal taken by the flip-flop 133 by the clock CK3 goes HIGH, the clock gates 134, 135 and 136 of the latch circuit 10 are closed to intercept the clocks CK1, CK2 and CK3 so that the flip-flops 131, 132 and 133 are unable to receive the clocks CK1, CK2 and CK3, and the latch circuit 10 is held in this state. In this embodiment, D1 is LOW, D2 is HIGH and D3 is HIGH. In this case, the outputs S1, S2 and S3 of the optimum clock selecting circuit 30' are LOW, LOW and HIGH, respectively, which are decided according to an algorithm, which will be described afterward. Thus, the clock CK3 is selected as the optimum clock SCK. Then, the flip-flop 434 of the phasing circuit 40 receives the input data signal DI' in synchronism with the clock CK3, and then provides an output signal D0'. The flip-flop 435 extracts the output signal D0' in synchronism with the system clock CK (=CK1), which is common to the bit synchronization circuits of the telephone exchange system, and then provides an output data signal D0.

Figure 15:
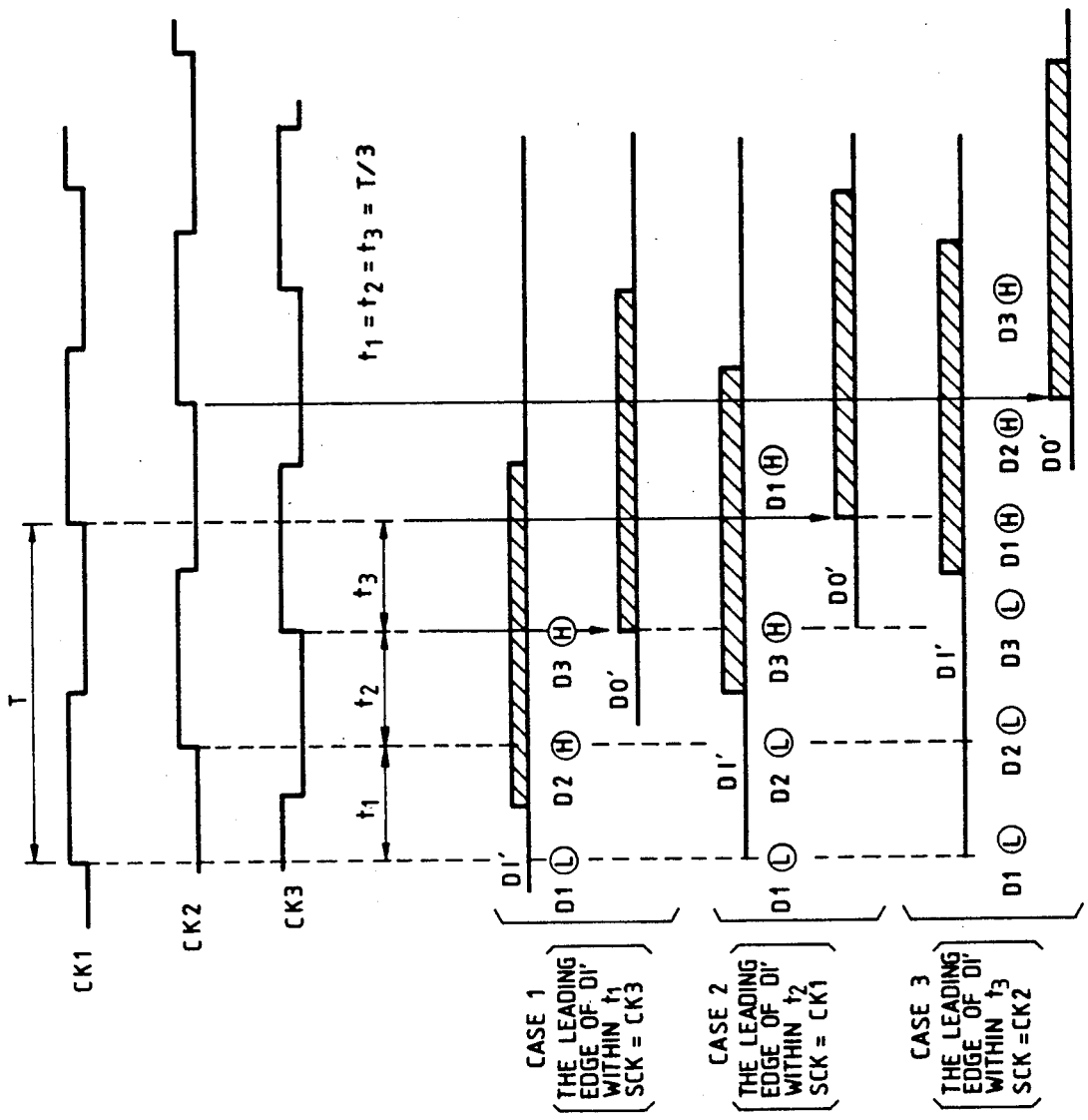

An algorithm for selecting the optimum clock SCK by the optimum clock selecting circuit 30' on the basis of the output signals D1, D2 and D3 of the latch circuit 10 will be described with reference to FIG. 15.

In Case 1, the leading edge of the data signal DI' exists in a time period t₁. In this case, D1=LOW, D2=HIGH and D3=HIGH. Suppose that the clock CK3 by which the data signal is extracted for the second time is the optimum clock SCK. Then, the leading edge of the clock CK3 coincides approximately with the center of the data signal DI', and hence the data signal can be stably extracted.

In Case 2, the leading edge of the data signal DI' exists in a time period t₂. In this case, D1=LOW, D2=LOW and D3=HIGH in the first period of the clock CK1, and D1=HIGH in the next period of the clock CK1. Suppose that the clock CK1 by which the data signal is extracted for the second time is selected as the optimum clock SCK. Then, the leading edge of the CK1 coincides approximately with the center of the data signal DI', and hence the data signal can be stably extracted.

In case 3, the leading edge of the data signal DI' exists in a time period t₃. In this case, D1=D2=D3=LOW, and D1=D2=HIGH in the next period of the clock CK1. Suppose that the clock CK2 by which the data signal is extracted for the second time is selected as the optimum clock SCK. Then, the leading edge of the clock CK2 coincides approximately with the center of the data signal DI', and hence the data signal can be stably extracted.

Thus, in this example, the central portion of the data signal can be extracted by selecting the clock which becomes HIGH in the second period of the clock CK1 as the optimum clock SCK.

Figures 16, 17:
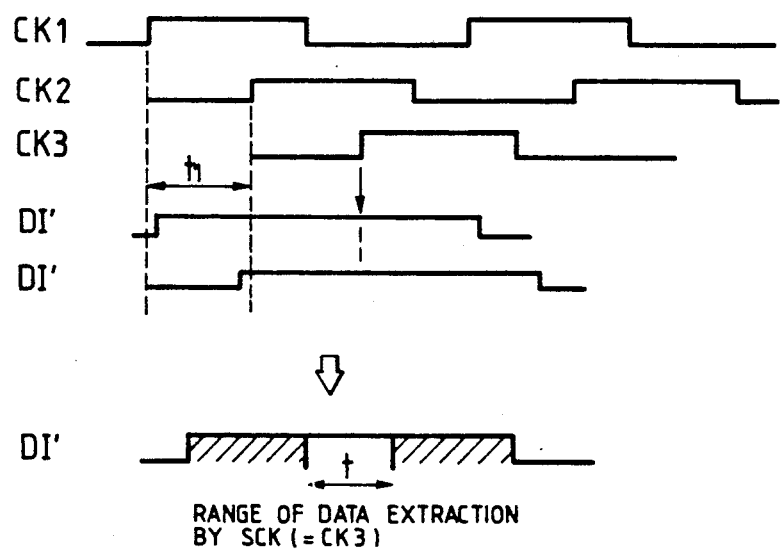
FIG. 17 is a table showing the decision operation of an optimum clock selecting circuit included in the circuits of FIG. 13.

The effects of this system will be described with reference to FIG. 16 showing a range of the data signal corresponding to the selected clock. When SCK=CK3, the data signal DI' is within a range from to . In this case, a range in which the clock CK3 corresponds to the data signal DI' is a time period t. Accordingly, even if the data signal DI' includes jitters in hatched ranges, an output signal can be effectively extracted.

Now, description will be made with reference to FIG. 17 with the reason for closing the clock gates 134, 135 and 136 to interrupt the application of the clocks to the flip-flops 131, 132 and 133 when the data received by the clock CK3 by the flip-flop 133 of the latch circuit 10 (FIG. 13) is HIGH.

When both the two successive data sampled by the clocks CK1, CK2 and CK3 are HIGH, it is decided upon the detection of the second HIGH that a decision is made, and then the clock gates are closed. Execution of such a procedure including the detection of the second data of HIGH and the specification of the phases of the clocks corresponding to the second data of HIGH requires a complicated circuit. To carry out such a procedure by a simple circuit, in the third embodiment, when data sampled by the clock CK3 becomes HIGH, data sampled by the clocks CK1 and CK2 before the data sampled by the clock CK3 are examined to specify a clock in which the second sample data becomes HIGH. This algorithm is shown in FIG. 17. The optimum clock selecting circuit 30' shown in FIG. 13 is a concrete configuration of this algorithm. Thus, when the data sampled by the clock CK3 becomes HIGH, the clock gates are closed to intercept the clocks, which simplifies the circuit.

Thus, the bit synchronization circuit in the third embodiment has a large margin to cope with input data signals having jitters, simple in construction and capable of stably regenerating an input data signal of a high data signaling rate.

What is claimed is:

1. A bit synchronization circuit provided for an individual subscriber's line in a telephone exchange system, comprising:
    latch means for receiving a plurality of clocks of different phases from a clock generating circuit provided in common to a plurality of bit synchronization circuits in said telephone exchange system, latching an input data signal transmitted thereto through said subscriber's line in response to said plurality of clocks of different phases, and providing latched output signals corresponding to said plurality of clocks of different phases;
    detecting means for receiving said latched output signals from said latch means, and comparing said latched output signals to detect a plurality of points at which a variation in phase of said input data signal occurs in a predetermined time period;
    regenerative output selecting means for receiving a detecting signal representing whether a variation in phase of said input data signal is detected by said detecting means, and selecting a latched output signal among said plurality of latched output signals provided by said latch means; and
    phasing means for phasing said latched output signal selected by said regenerative output selecting means.

2. A bit synchronization circuit according to claim 1, wherein said latch means has four flip-flops, and said four flip-flops correspondingly latch said input data signal in response to said plurality of clocks of different phases lagging at a step of 90°, respectively, and provide said latched input data signals.

3. A bit synchronization circuit according to claim 2, wherein said detecting means has four EXOR gates each receiving outputs of the two different flip-flops among said four flip-flops of said latch means, and four flip-flops for holding outputs of said EXOR gates, respectively.

4. A bit synchronization circuit according to claim 3, wherein said regenerative output selecting means receives outputs of said four flip-flops of said detecting means, selects a regenerative clock according to a predetermined algorithm on the basis of a combination of said outputs of said four flip-flops of said detecting means, and provides a regenerative output selection signal.

5. A bit synchronization circuit provided for an individual subscriber's line in a telephone exchange system, comprising:

latch means for receiving n clocks of different phases and of a clock rate equal to $1/m$ ($m=n/k$, where k, n and m are integers) of a data signaling rate of an input data signal from a clock generating circuit provided in common to a plurality of bit synchronization circuits in said telephone exchange system, correspondingly latching said input data signal transmitted through said subscriber's line in response to said clocks, and providing m sets of output signals each including k latch output signals corresponding to said clocks;

detecting means for receiving one set of k latch output signals, and comparing said latch output signals to detect a plurality of points at which a variation in phase of said input data signal occurs in a predetermined time period;

regenerative output selecting means for receiving a detecting signal representing whether a variation in phase of said input data signal is detected by said detecting means, and selecting m latched output signals among said n latched output signals on the basis of said detection signal;

phasing means for phasing said m latched output signals selected by said regenerative output selecting means; and data signaling rate converting means for producing an output data signal of a data signaling rate m times that of input signals output by said phasing means by combining said phased m input signals output by said phasing means.

6. A bit synchronization circuit according to claim 5, wherein $n=8$, $m=2$, $k=4$, said latch means has eight flip-flops, and said eight flip-flops produce two sets of output signals each having four latched outputs by latching said input data signal by using clocks of different phases lagging at a step of 45° and of a clock rate half the data signaling rate of the input data signal.

7. A bit synchronization circuit according to claim 6, wherein said detecting means comprises four EXOR gates, each of said four EXOR gates receiving gates two different output signals among said four output signals of said latch means, and four flip-flops which holds output signals of said EXOR gates, respectively.

8. A bit synchronization circuit according to claim 7, wherein said regenerative output selecting means receives output signals of said four flip-flops of said detecting means, selects two latched output signals based on two clocks differing in phase by 180° from each other as regenerative clocks according to a predetermined algorithm on the basis of a combination of said output signals of said four flip-flops, and provides regenerative output selection signals.

* * * * *